United States Patent Office 2,759,338
Patented Aug. 21, 1956

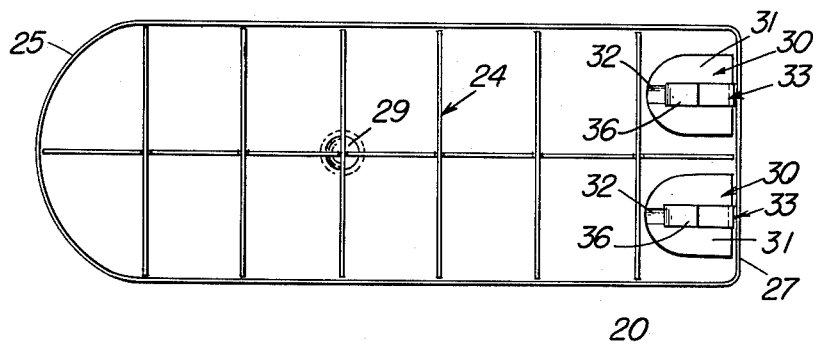
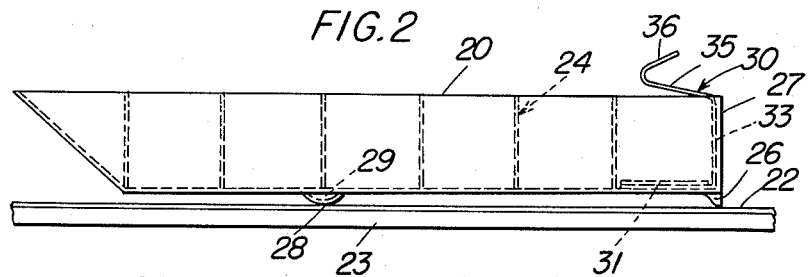
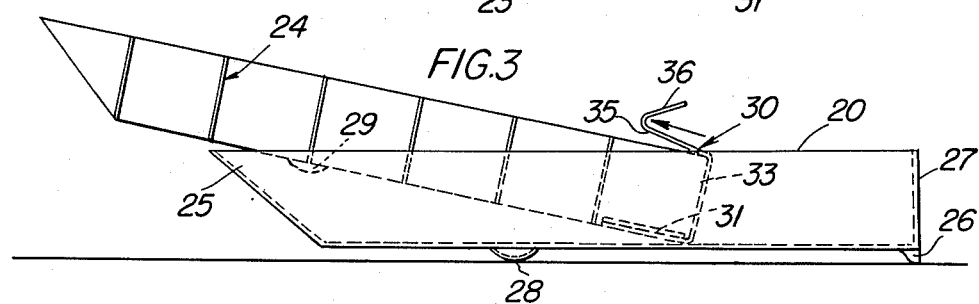
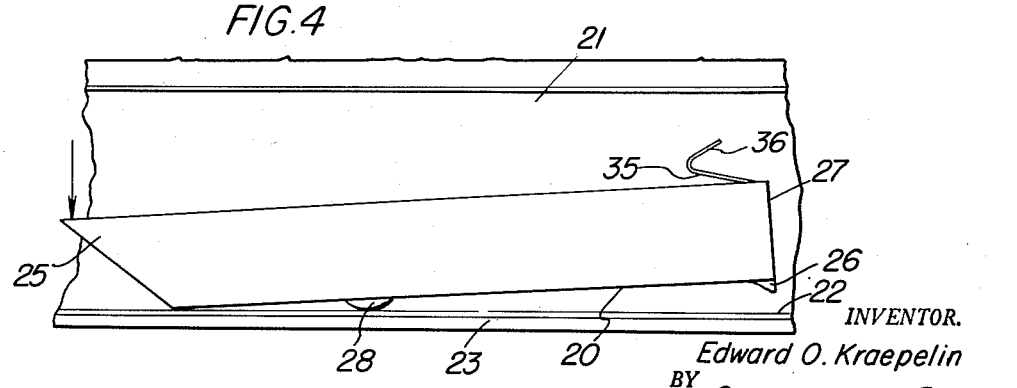

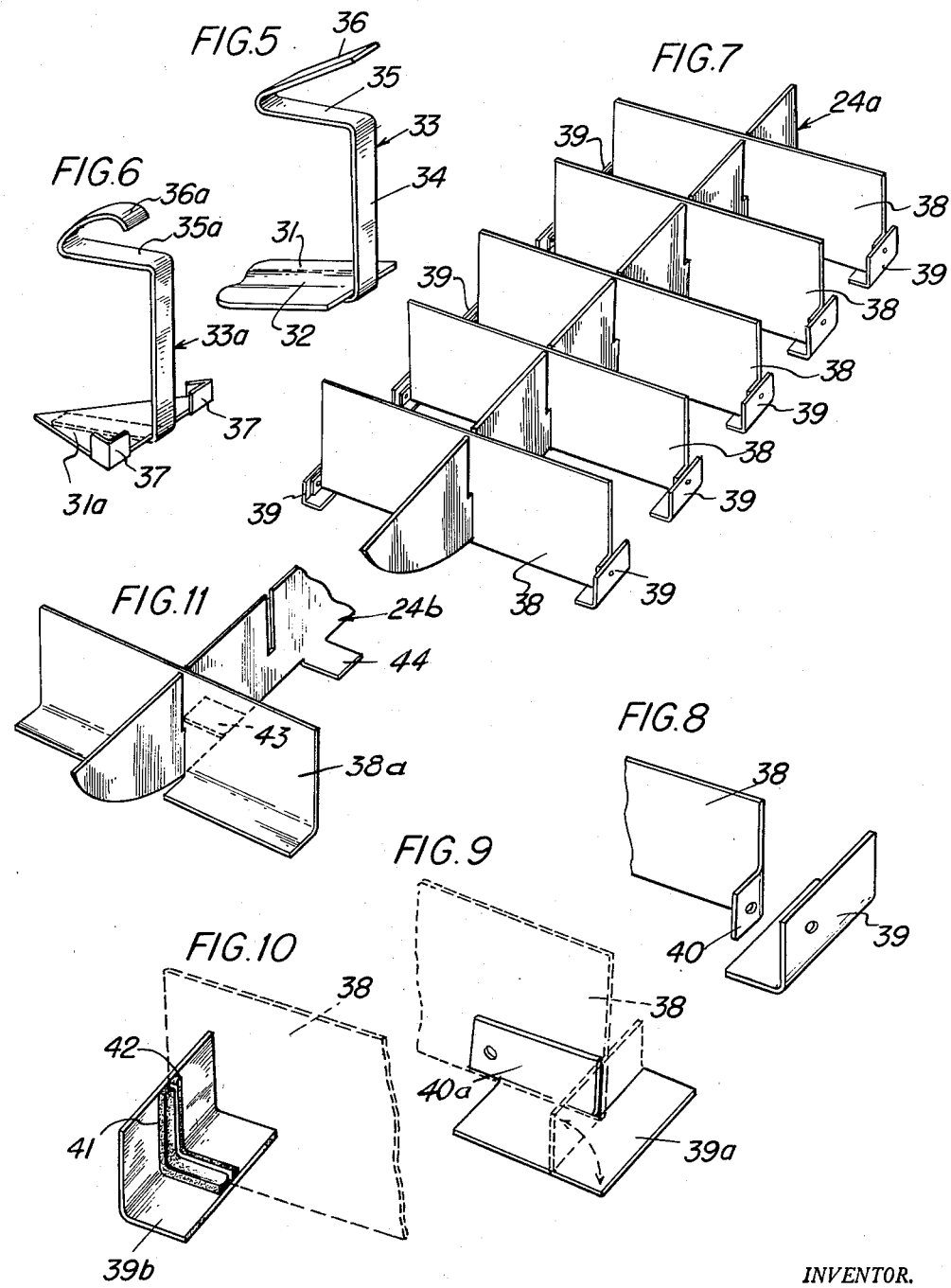

2,759,338

FREEZING TRAY

Edward O. Kraepelin, Los Angeles, Calif.

Application November 13, 1952, Serial No. 320,223

10 Claims. (Cl. 62—108.5)

This invention relates to freezing equipment, and more particularly to a tray of the type which may be inserted into the freezing compartment of a refrigerator to freeze the contents of the tray. The invention is especially useful in its application to freezing ice cubes in household refrigerators, to which use, however, it is not restricted.

It is generally a difficult matter, requiring the use of considerable force, to disengage an "ice cube" tray from the surface which supports it in the freezing compartment of a refrigerator, to which the tray has become frozen. Furthermore, after disengaging and removing such tray from the refrigerator, it is usual to turn the tray upside down in a sink and to apply hot water to it until all of the units frozen therein are loosened and rest upon the warm surface of the sink. Besides being wasteful of the frozen material, this method has obvious sanitary disadvantages.

I have now found it possible to provide a freezing tray which may be simply and easily disengaged from the refrigerator surface which supports it when frozen thereto, which is economical with respect to the units frozen in the tray, and of the freezing energy of the refrigerator, and which makes unnecessary the deposit of its frozen units in a sink.

According to the invention, the freezing tray is formed to provide a plurality of feet which hold it slightly above the supporting refrigerator surface, together with a projection which provides a pivot point about which the tray may be rocked to disengage it from the supporting surface, even when frozen thereto. Furthermore, one end of the tray is given an upwardly-sloping form to the outer edge of which downward pressure may be applied to rock the tray about its projection as a pivot point with sufficient leverage to disengage it easily from its supporting surface. The upwardly-sloping form of the tray end also provides a ramp along which the loosened contents of the tray may be moved out of the tray as desired. The invention also contemplates means for moving the loosened contents of the tray longitudinally thereof and up the ramp.

The invention is shown by way of illustration in the accompanying drawings, wherein—

Fig. 1 is a plan view of a freezing tray constructed and arranged according to the invention, together with a compartmenting rack positioned in the tray and frozen cube moving members also in place in the tray;

Fig. 2 is a side elevation of the freezing tray illustrated in Fig. 1, shown as resting upon a supporting surface, which in turn is shown in broken side elevation;

Fig. 3 is a side elevation similar to that shown in Fig. 2 illustrating the method of removing frozen cubes or the like therefrom;

Fig. 4 is a side elevation of the same freezing tray, illustrating the method of disengaging the tray from the freezing compartment of a refrigerator;

Fig. 5 is a perspective view of a frozen cube, moving member or deformed trowel-like member for use with the freezing tray;

Fig. 6 is a perspective view of another type of frozen cube moving member or deformed trowel-like member;

Fig. 7 is a variant form of compartmenting rack for use with the freezing tray illustrated in Fig. 1; and Figs. 8, 9 and 10 illustrate different types of auxiliary side angles and different methods of fixing them to the ends of transverse members of a compartmenting rack; and Fig. 11 is a broken perspective view of still another type of compartmenting rack.

In the embodiment of the invention which is illustrated in Figs. 1 to 4, there is shown a freezing tray 20 which is adapted to be housed in the freezing compartment 21 of a refrigerator, resting upon the upper surface 22 of the lower member 23 of the freezing compartment. A specially-formed compartmenting rack 24 is placed within the freezing tray 20 to subdivide the material to be frozen therein. Thus, the contents of the tray 20 (as water), subdivided by the rack 24, may be frozen in the freezing compartment 21 of the refrigerator (as to form ice cubes).

The freezing tray 20 is of generally well-known construction, being of a size which is adapted for insertion into the freezing compartment 21 of a refrigerator. However, the freezing tray is formed with an end 25 which slopes upwardly to constitute a ramp, for a purpose which will subsequently appear. In practice the end 25 is positioned near the outer end of the freezing compartment 21 when the freezing tray 20 is inserted therein. The tray 20 may be provided with feet 26, 26 which extend downwardly from the rear end 27 of the tray, that is to say the end which is opposite the upwardly sloping end 25. Furthermore, a projection 28 is formed generally centrally of the bottom of the freezing tray 20, extending outwardly therefrom. As here shown the projection 28 is formed as a dimple in the bottom of the tray and such construction is presently preferred. However, it will be obvious that the projection 28 might be otherwise formed.

From the foregoing it will be evident that the freezing tray 20 is supported upon the upper surface 22 of the lower member 23 of the freezing compartment by means of the projection 28 and its rear end or the feet 26 which rest thereon. The projection and the feet provide contacts for the tray upon the surface. When the freezing tray becomes frozen to the surface 22, as is usually the case when the contents of the tray becomes frozen, it is a simple matter to free the tray by exerting pressure upon its upwardly sloping end 25 in the manner illustrated in Fig. 4 of the drawings. Accordingly, the projection or dimple 28 provides a pivot point about which the freezing tray 20 may be rocked to free it from its supporting surface when the tray becomes frozen thereto, it being merely necessary to exert downward pressure upon the upwardly sloping end 25 of the tray.

The compartmenting rack 24 is of well-known construction, being insertable within the freezing tray 20 for dividing the substance to be frozen therein into separate sections. The rack is shaped to conform with the upwardly sloping end 25 of the tray and makes substantial contact with the ends and sides of the tray in the usual manner. After removing the freezing tray 20 from the freezing compartment 21 in the manner already described, the frozen contents of the tray may be loosened by application to the outside of the tray of hot water or a hot-water soaked cloth in known manner. Following this it is merely necessary to move the rack and the frozen contents of the tray longitudinally of the latter to move the rack and the frozen units divided thereby up the sloping end of ramp 25 and out of the tray. Such movement permits removal from both the tray and the rack of the frozen units which are successively moved along the upwardly sloping end 25 of the tray, while permitting return, as desired, of the more rearwardly positioned units to the tray by reversing the described movement of the rack. Accordingly, only the number of frozen units which are required for immediate use need be removed from the tray. The remaining units may be saved for subsequent use and even returned to the freezing compartment 21.

In order to prevent the contents of the tray from freezing in the projection 28 when the latter is formed as a dimple in the bottom of the tray, a button 29 is provided of a size equal to that of the dimple. The button 29 is preferably formed upon the bottom of the rack 24 in a position to fill the dimple when the rack is in place. Thus the liquid in the tray does not enter the dimple and freeze therein. Sliding of the rack and the frozen units which it defines is, therefore, not resisted or prevented by reason of the formation of a dimple in the bottom of the freezing tray.

Means is provided for facilitating movement of the rack and with it the frozen units from the position illustrated in Figs. 1 and 2 of the drawings to the position illustrated in Fig. 3. A convenient means of this character is provided by deformed trowel-like members 30, 30 which are insertable into the spaces formed by the rack 24 at the rear end 27 of the freezing tray 20. The adjacent contents of the freezing tray is frozen to the deformed trowel shaped member. One such member is here shown as positioned in each of the two end compartments provided by the rack adjacent the rear end 27 of the tray. The detailed construction of the deformed trowel-like members is best seen in Fig. 5. The deformed trowel-like members 30 comprise plates 31 adapted to be positioned at the bottom of the tray in the two end compartments, such plates having downwardly extending depressions 32 thereon to hold the plates generally above the bottom of the tray. See Figs. 1, 2 and 3. Stems 33, 33 are fixed to the plates 31 and are turned at right angles therefrom to extend upwardly, as at 34, along the adjacent end 27 of the tray, being bent forwardly, as at 35, at the top of the tray to extend at an angle thereto, and being reversely bent, as at 36, for a purpose which will now be described. From the foregoing description it will be evident that the plates 31 and the upwardly extending parts 34 of the stems 33 will become frozen into the tray with the units which are frozen in the two compartments containing the deformed trowel-like members 30. Accordingly, when the freezing tray 20 is warmed it is possible to apply pressure to the reverse bends 36 of the stems 33, in the direction of the upwardly sloping end 25 of the tray, to slide the contents of the tray in the manner described and as illustrated in Fig. 3 of the drawings.

The deformed trowel-like members 30 may, of course, be formed in a variety of ways. One variant form of the trowel-like member is illustrated in Fig. 6. Here the plate 31a is shaped like a triangle with its base of a size to coincide substantially with the full width of the frozen unit adjacent the rear end 27 of the tray. No downwardly extending depression 32 is formed in the plate 31a. Instead, the stem 33a extends longitudinally beneath the plate 31a from substantially the mid-point of its base to substantially the apex of the triangle opposite this base. Thus, the portion of the stem 33a beneath the plate 31a elevates the plate slightly above the bottom of the tray. In order that the frozen unit may be lifted from the tray by means of the deformed trowel-like member 30a, angle elements 37, 37 are fixed to the plate 31a at opposite ends of the triangle base, extending upwardly therefrom. Also, in this embodiment, the reverse bend 36a of the stem 33a is turned slightly downwardly at its end to provide a larger surface of contact in pushing the compartmented rack 24 and the frozen units therein toward and over the upwardly sloping end of ramp 25 of the freezing tray.

It is to be noted that the compartmenting rack 24 may be otherwise constructed than in the embodiment illustrated in Figs. 1, 2 and 3. Fig. 7 illustrates a variant construction of a compartmenting rack 24a. Here the outer ends of the transverse rack members 38 carry angles 39 extending in a direction longitudinally of the rack and also extending upwardly and beneath the lower corners of the transverse members 38. Thus, when the rack is pushed forwardly over the upwardly sloping end 25, the loosened frozen units will be prevented by means of the angles 39 from falling, and will be held by the rack until purposely removed. In order that the frozen units may be easily removed, sufficient space is left between the individual angles 39 for a thumb or finger to be placed beneath the frozen unit to lift it from the rack.

The angles 39 may be fixed to the lower corners of the transverse rack members in a variety of ways. In the embodiment illustrated in Figs. 7 and 8 a unitary tongue 40 is provided at the lower edge of the transverse member and is turned at right angles thereto. The angle 39 is then fixed at the end of the transverse member by riveting, swaging, welding or the like. As here shown, both the unitary tongue 40 and the angle 39 are perforated to register with one another for attachment of the angle to the tongue. In the embodiment illustrated in Fig. 9, the angle is formed from a metal plate turned substantially in a right angle to bear against two edges of the transverse rack element 38. A connecting plate 40a is connected, as by welding along edges thereof, to the formed angle 39a and is perforated for connecting the angle to the transverse rack member 38.

Fig. 10 represents a rubber angle 39b having parallel members 41, 42 formed or fixed centrally within the angle and separated by a distance slightly smaller than the thickness of the transverse rack members 38. Thus, the angle 39b may be held in place upon the frame by friction.

The embodiment illustrated in Fig. 11 shows a transverse rack member 38a which is itself turned at a right angle along its lower edge to assist in lifting the formed ice cube from the tray. Auxiliary aid is given in lifting the ice cubes by tongues 43 and 44 turned at 90° right and left from the lower edge of the longitudinal member of the compartmenting rack 24b.

The forms of the invention here described and illustrated are presented merely as examples of how the invention may be embodied and applied. Other forms, embodiments and applications of the invention, coming within the proper scope of the appended claims, will, of course, suggest themselves to those skilled in the refrigerating and freezing arts.

I claim:

1. Freezing equipment comprising a freezing tray adapted to be inserted into a freezing compartment of a refrigerator, said tray having one straight end and the opposite end constructed as an arcuately shaped ramp provided with a rim and arranged to facilitate individual discharge of its loosened contents longitudinally thereof, said tray having a single projection disposed forwardly center of its bottom constructed and arranged to pivotally free said tray from a frozen supporting surface by pressure applied to said arcuate rim.

2. Freezing equipment comprising: a freezing tray adapted to be inserted into the freezing compartment of a refrigerator, said freezing tray having a gradually upwardly-sloping end along which its loosened contents may be pushed out of said tray longitudinally thereof, said tray also having feet extending downwardly from its end opposite to its upwardly-sloping end, said tray still further having a dimple formed substantially centrally of its bottom and extending outwardly therefrom, the dimple in said tray and the feet extending downwardly therefrom providing contacts for said tray upon the surface which supports it, and the dimple providing a pivot point about which said tray may be rocked to free it from its supporting surface when frozen thereto by downward pressure upon its upwardly sloping end; a compartmenting rack insertable in said tray; and a button of a size equal to that of the dimple formed in said tray, said button being formed upon the bottom of said rack to close the cavity in said tray provided by the dimple therein and prevent freezing of the contents of said tray within the dimple therein.

3. Freezing equipment according to claim 1 having a rack insertable in said tray for dividing the substance to be frozen therein into separate sections, said rack being shaped to conform to said arcuate ramp of said tray.

4. Freezing equipment according to claim 3 wherein angles are disposed at the outer ends of the transverse members of said rack, said angles extending beneath and on either side of said members in a direction longitudinally of said rack.

5. Freezing equipment comprising: a freezing tray adapted to be inserted into the freezing compartment of a refrigerator, said freezing tray having a gradually upwardly-sloping end along which its loosened contents may be pushed out of said tray longitudinally thereof, said tray also having feet extending downwardly from its end opposite to its upwardly-sloping end, said tray still further having a projection formed substantially centrally of its bottom and extending outwardly therefrom, the projection on said tray and the feet extending downwardly therefrom providing contacts for said tray upon the surface which supports it, and the projection providing a pivot point about which said tray may be rocked to free it from its supporting surface by downward pressure upon its upwardly-sloping end; and deformed trowel-like members insertable at the end of said tray opposite to its upwardly-sloping end, said trowel-like members having plates adapted to be positioned at the bottom of said tray with downwardly extending projections thereon to hold such plates generally above the bottom of said tray and said trowel-like members also having stems turned at right angles therefrom to extend upwardly and out of said tray, the stems on said trowel-like members terminating in pushing surfaces, whereby the loosened contents of said tray may be pushed longitudinally thereof.

6. Freezing equipment comprising: a freezing tray adapted to be inserted into the freezing compartment of a refrigerator, said freezing tray having a gradually upwardly-sloping end along which its loosened contents may be pushed out of said tray longitudinally thereof, said tray also having feet extending downwardly from its end opposite to its upwardly-sloping end, said tray still further having a projection formed substantially centrally of its bottom and extending outwardly therefrom, the projection on said tray and the feet extending downwardly therefrom providing contacts for said tray upon the surface which supports it, and the projection providing a pivot point about which said tray may be rocked to free it from its supporting surface by downward pressure upon its upwardly-sloping end; and a rack insertable in said tray for dividing the substance to be frozen therein into separate sections, said rack being shaped to conform to the upwardly sloping end of said tray; in combination with deformed trowel-like members insertable into the spaces formed by said rack at the end of said tray opposite to its upwardly-sloping end, said trowel-like members having plates adapted to be positioned at the bottom of said tray with downwardly extending projections thereon to hold such plates generally above the bottom of said tray and said trowel-like members also having stems turned at right angles therefrom to extend upwardly and out of said tray, the stems on said trowel-like members terminating in pushing surfaces, whereby the loosened contents of said tray may be pushed longitudinally thereof.

7. Freezing equipment comprising: a freezing tray adapted to be inserted into the freezing compartment of a refrigerator, said freezing tray having a gradually upwardly-sloping end along which its loosened contents may be pushed out of said tray longitudinally thereof, said tray also having feet extending downwardly from its end opposite to its upwardly-sloping end, said tray still further having a dimple formed substantially centrally of its bottom and extending outwardly therefrom, the dimple in said tray and the feet extending downwardly therefrom providing contacts for said tray upon the surface which supports it, and the dimple providing a pivot point about which said tray may be rocked to free it from its supporting surface when frozen thereto by downward pressure upon its upwardly-sloping end; and a rack insertable in said tray for dividing the substance to be frozen therein into separate sections, said rack being shaped to conform to the upwardly sloping end of said tray; in combination with deformed trowel-like members insertable into the spaces formed by said rack at the end of said tray opposite to its upwardly-sloping end, said trowel-like members having plates adapted to be positioned at the bottom of said tray with downwardly extending depressions therein to hold such plates generally above the bottom of said tray, and said trowel-like members also having stems turned at right angles therefrom to extend upwardly and out of said tray, the stems on said trowel-like members being bent to extend forwardly of said tray and to provide pushing surfaces, whereby the loosened contents of said tray may be pushed longitudinally thereof; and a button of a size equal to that of the dimple formed in said tray, said button being formed upon the bottom of said rack to close the cavity in said tray provided by the dimple therein and preventing freezing of the contents of said tray within the dimple therein.

8. Freezing equipment comprising: a freezing tray adapted to be inserted into the freezing compartment of a refrigerator, said freezing tray having an upwardly-sloping end along which its loosened contents may be pushed out of said tray longitudinally thereof, said tray also having feet extending downwardly from its end opposite to its upwardly-sloping end, said tray still further having a dimple formed substantially centrally of its bottom and extending outwardly therefrom, the dimple in said tray and the feet extending downwardly therefrom providing contacts for said tray upon the surface which supports it, and the dimple providing a pivot point about which said tray may be rocked to free it from its supporting surface by downward pressure upon its upwardly sloping end; and a rack insertable in said tray for dividing the substance to be frozen therein into separate sections, said rack being shaped to conform to the upwardly sloping end of said tray; in combination with deformed trowel-like members insertable into the spaces formed by said rack at the end of said tray opposite to its upwardly-sloping end, said trowel-like members having plates adapted to be positioned at the bottom of said tray with upwardly extending corners thereon, and said trowel-like members also having stems turned at right angles therefrom to extend upwardly and out of said tray, the stems on said trowel-like members being bent to extend forwardly of said tray and to provide pushing surfaces, whereby the loosened contents of said tray may be pushed longitudinally thereof; and a button of a size equal to that of the dimple formed in said tray, said button being formed upon the bottom of said rack to close the cavity in said tray provided by the dimple therein and prevent freezing of the contents of said tray within the dimple therein.

9. Freezing equipment comprising a freezing tray adapted to be inserted into a freezing compartment of a refrigerator, said tray having one straight end and the opposite end constructed and arranged as an arcuately inclined ramp to facilitate discharge of ice cubes over the rim thereof, a rack insertable in said tray for dividing the substance to be frozen therein into separate sections, said rack being shaped to conform to said tray.

10. Freezing equipment according to claim 9 having angles carried at the lower edges of the transverse members of said rack, said angles extending beneath and on either side of said members.

References Cited in the file of this patent

UNITED STATES PATENTS

| | | |
|---|---|---|
| 1,830,260 | Buchanan | Nov. 3, 1931 |
| 2,189,959 | Money | Feb. 13, 1940 |
| 2,323,486 | Pizarro | July 6, 1943 |
| 2,343,565 | Mallard | Mar. 7, 1944 |
| 2,498,964 | Roethel | Feb. 28, 1950 |
| 2,622,410 | Roberts | Dec. 23, 1952 |